(12) United States Patent
Mossman et al.

(10) Patent No.: US 7,395,650 B2
(45) Date of Patent: Jul. 8, 2008

(54) COMBINE AUGER TROUGH CLEANOUT DOOR

(75) Inventors: Michael Wayne Mossman, Silvis, IL (US); Timothy Franklin Christensen, Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/588,533

(22) Filed: Oct. 26, 2006

(65) Prior Publication Data

US 2007/0186531 A1    Aug. 16, 2007

Related U.S. Application Data

(60) Provisional application No. 60/774,117, filed on Feb. 16, 2006.

(51) Int. Cl.
*A01D 45/02* (2006.01)
(52) U.S. Cl. .................................................. 56/119
(58) Field of Classification Search ............... 56/291, 56/119; 460/13, 106; 198/671; 239/664, 239/675, 682; 414/526
See application file for complete search history.

(56) References Cited

U.S. PATENT DOCUMENTS

| | | | |
|---|---|---|---|
| 3,333,405 A | 8/1967 | Bulin | |
| 3,664,525 A | 5/1972 | Herbsthofer | |
| 3,872,982 A | 3/1975 | Rowland-Hill | |
| 4,070,810 A * | 1/1978 | Brakke | 56/291 |
| 4,251,980 A | 2/1981 | Miller | |
| 4,303,202 A * | 12/1981 | Hanford | 239/664 |
| 4,397,319 A | 8/1983 | Schuhmacher | |
| 4,400,131 A | 8/1983 | Blake | |
| 4,455,814 A | 6/1984 | Kienholz | |
| 4,466,447 A * | 8/1984 | Hoefer et al. | 460/13 |
| 4,529,085 A | 7/1985 | Johnson | |
| 4,594,840 A | 6/1986 | D'Almeida et al. | |
| 4,863,415 A | 9/1989 | Carnewal et al. | |
| 4,967,863 A | 11/1990 | Teijido et al. | |
| 5,088,960 A | 2/1992 | Stickler et al. | |
| 5,305,493 A | 4/1994 | Prenn | |
| 5,380,247 A | 1/1995 | Underwood | |
| 5,507,841 A | 4/1996 | Heckman et al. | |
| 5,546,630 A | 8/1996 | Long | |
| 5,624,315 A | 4/1997 | Jonckheere | |
| 5,669,531 A * | 9/1997 | Hagemeyer | 222/153.14 |
| 6,036,598 A | 3/2000 | Harden et al. | |

(Continued)

FOREIGN PATENT DOCUMENTS

EP    0179930 A    5/1986

(Continued)

OTHER PUBLICATIONS

European Search Report dated Jun. 5, 2007, 4 pages.

(Continued)

*Primary Examiner*—Árpád Fábián-Kovács

(57) ABSTRACT

A combine head trough assembly comprises a curved steel panel having two openings passing therethrough, one opening being disposed at each end of the panel, the assembly further comprising two doors configured to respectively cover the two openings. The doors are pivoted between a closed position during normal combine operation and an open position to permit cleanout of crop material.

16 Claims, 6 Drawing Sheets

U.S. PATENT DOCUMENTS

| | | |
|---|---|---|
| 6,058,690 A | 5/2000 | Rutt et al. |
| 6,089,831 A | 7/2000 | Bruehmann et al. |
| 6,102,795 A | 8/2000 | Behrens |
| 6,285,198 B1 | 9/2001 | Nelson et al. |
| 6,290,361 B1 | 9/2001 | Berzin |
| 6,367,234 B1 | 4/2002 | Hurlburt |
| 6,508,705 B1 | 1/2003 | Van Overschelde |
| 6,835,130 B2 | 12/2004 | Pope et al. |
| 7,011,580 B2 * | 3/2006 | Claeys et al. ............... 460/106 |
| 2004/0184905 A1 * | 9/2004 | Kinzenbaw et al. ......... 414/526 |

FOREIGN PATENT DOCUMENTS

| | | |
|---|---|---|
| JP | 05146216 A | 6/1993 |
| JP | 2001028938 A | 2/2001 |

OTHER PUBLICATIONS

Deere &Co., 9650 STS and 9750 STS Combines, 2000, 4 pages.

Drawings of Prior Art Auger Casting and Drain Opening Closure Plate Arrangements, 2 sheets.

* cited by examiner

COMBINE AUGER TROUGH CLEANOUT DOOR

This invention claims priority under 35 U.S.C. 120 to U.S. Provisional Patent Application No. 60/774,117 for a "Combine Auger Trough Cleanout Door", filed Feb. 16, 2006.

FIELD OF THE INVENTION

This invention relates to combine heads and, more particularly, it relates to systems for cleaning combine heads.

BACKGROUND OF THE INVENTION

A combine head is the structure mounted on the front of a combine harvester to gather grain and non-grain crop materials, separate them from the ground or stalks, and convey them to a combine processing section that is typically disposed inside the vehicle itself. The processing section in the vehicle separates crop materials from a stalk or cob as is appropriate.

One common style of combine head is one used to harvest corn, and therefore is called a corn head. Corn heads typically include a laterally-extending frame (relative to movement of the combine) to cover multiple crop rows, that cradles a laterally-extending auger trough configured to receive ears of corn. The auger trough directs them to a center portion of the head where they are then conveyed backward through a central opening in the corn head to the processing section of the combine vehicle. The frame also supports an auger for rotation slightly above the lower surface of the trough. Flights on the auger engage ears of corn that are dumped into the trough and convey them to the central portion of the corn head where they are removed from the corn head for in field processing by the processing section of the vehicle.

Row units are fixed to a leading edge of the troughs in a spaced-apart arrangement extending across the width of the corn head. Each row unit is configured to gather and harvest ears of corn from a single row of corn stalks as the combine travels through the field. Each row unit separates the ears of corn from the cornstalk itself and deposits the ears in the leading edge of the trough directly behind each row unit.

Corn-harvesting is a robust process in which there is a great deal of shaking, banging and jostling. All of this activity causes individual corn grains and other plant matter to become separated from the ears of corn and to become bunched in various portions of the corn head, stuck in corners, even to rest in the bottom of the auger troughs in the space between the auger flights and the trough.

All this material must be cleaned out of the corn head between harvesting sessions for a variety of reasons. First, the corn residue left in the corn head, like any plant matter, is subject to fungus, mold, parasites, and rot. It is necessary to remove this plant matter from the corn head before it has a chance to grow the relevant species of parasitic contamination. Second, corn kernels from one variety of corn can contaminate other varieties of corn that are subsequently harvested by the corn head. Third, residual plant matter attracts moisture and can build up on the corn head surfaces, decay the paint and cause rust.

One of the prime places for plant matter to be left in the corn head is in the bottom of the trough. Furthermore, plant matter from higher surfaces is washed down into the trough whenever farmers clean their equipment with water hoses or a power washer.

To permit the combined water and plant matter to leave the combine head during cleaning, some manufacturers have provided corn heads with a small opening in one of the end sheets of the corn head. "End sheets" are the two vertical walls that are bolted, welded or otherwise fixed to both outer ends of the corn head frame and trough to close off the ends of the trough.

While these openings have been somewhat useful, they have not provided for the complete removal of plant matter from the auger trough because they must be made small enough to minimize crop loss during harvesting operations. In addition, combines having one of the small openings in one end sheet require all the plant material to be pushed to the end sheet of the corn head having the opening. If the combine is on uneven ground, or for any reason is tilted away from the end sheet having the opening, water naturally runs away from the opening and naturally carries the plant matter with it. As a result, extra effort and time must be taken during cleanout to force the water uphill and out the opening.

What is needed, therefore, is an apparatus for cleaning out the auger troughs of combine heads that provides better access and does not retain as much residual plant matter. What is also needed is an apparatus for cleaning out the auger troughs of combine heads that is usable regardless of the orientation of the combine head itself.

SUMMARY OF THE INVENTION

In one form the invention includes a combine head trough assembly for receiving crop material, the combine head trough assembly having a longitudinally extending trough panel configured to surround at least the lower portion of a cross auger of a combine head. The trough panel defines first and second openings in a lower portion thereof, the first and second openings being disposed adjacent either end of the trough panel. Doors are positioned at the first and second openings and displaceable between a closed position to prevent leakage of crop material therethrough and an open position to permit the exit of cleanout water and waste crop material.

DETAILED DESCRIPTION OF THE INVENTION

Figure 1:
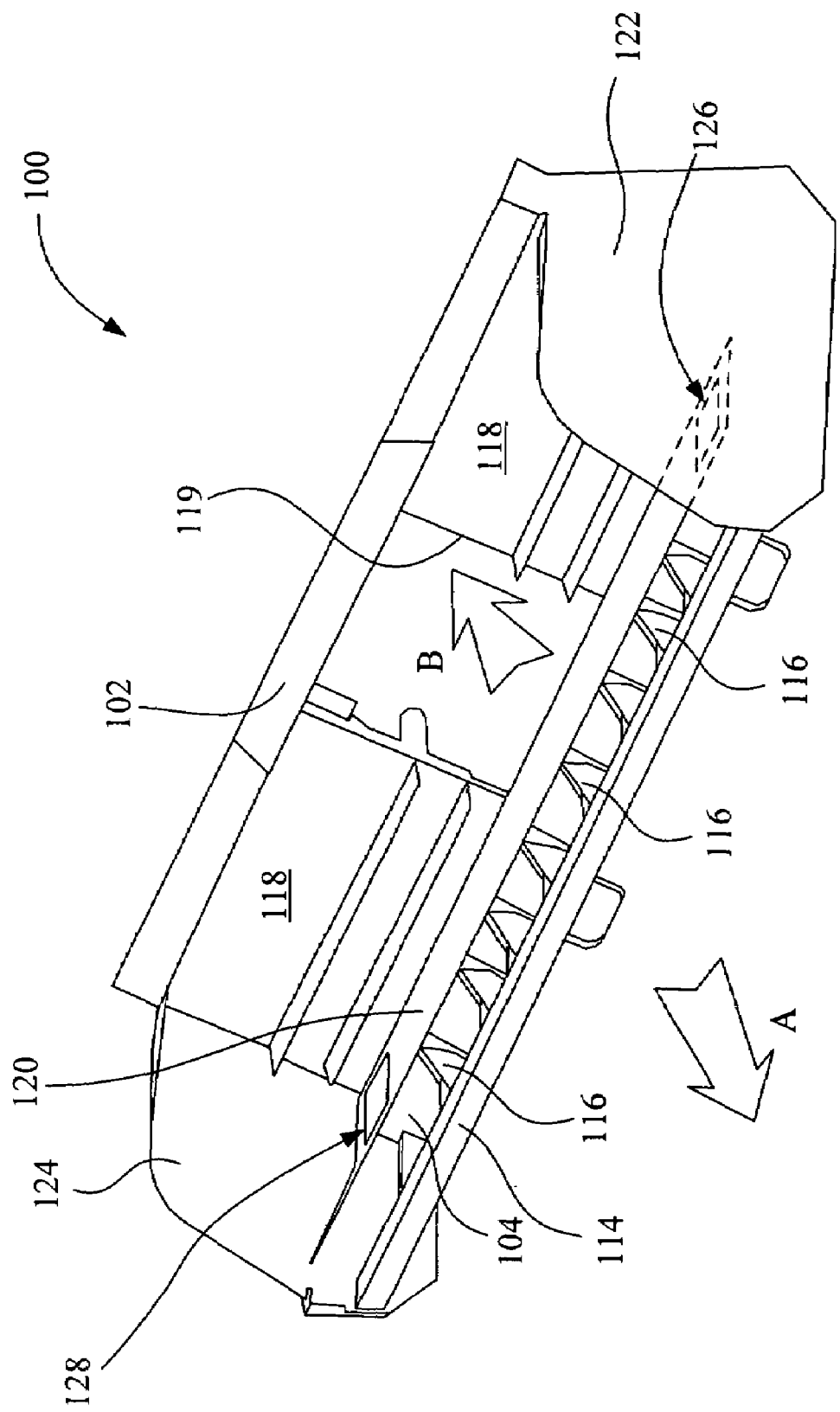
FIG. 1 is a perspective view of a combine head embodying the present invention.
Figure 2:
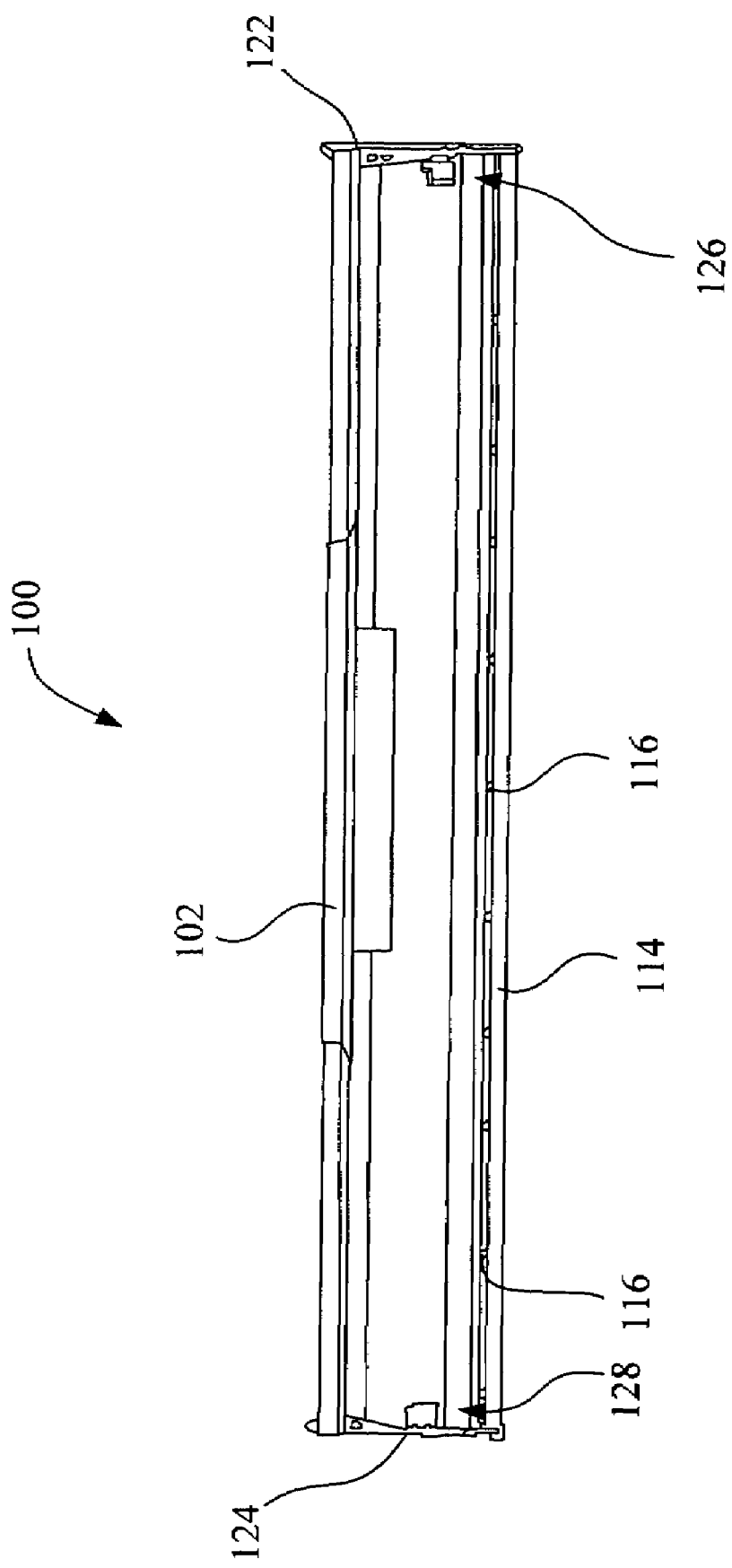
FIG. 2 is a view taken from the underside of FIG. 1 on lines 2-2 of FIG. 1.
Figure 3:
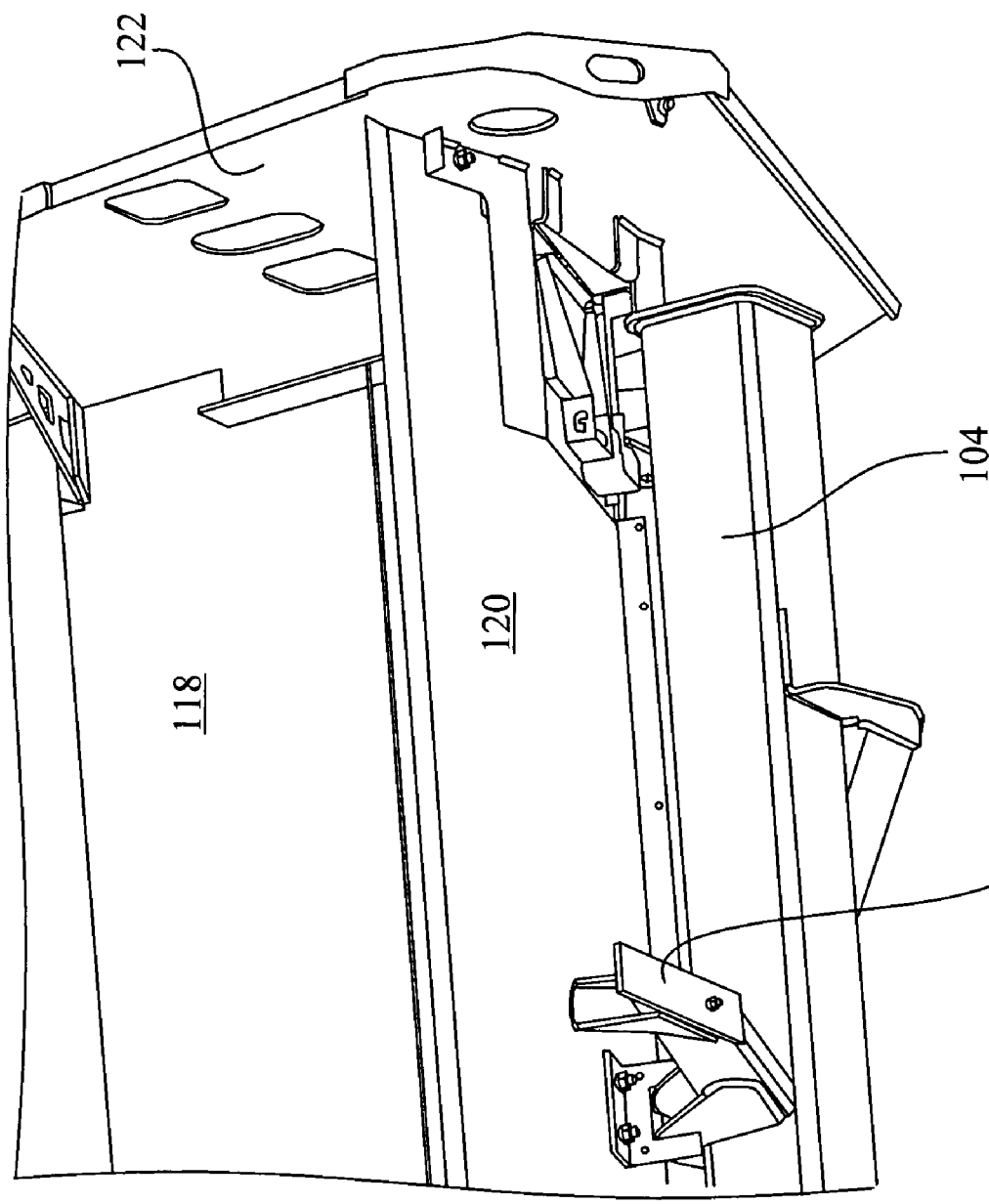
FIG. 3 is an enlarged partial perspective view of the combine head of FIG. 1, taken from the forward side with beam 114 removed.

Referring now to the FIGS. 1 and 2, a combine head frame, generally indicated by reference character 100, includes a laterally-extending upper beam 102, a laterally extending lower beam 104, a laterally-extending row unit beam 114, and a plurality of fore-and-aft extending brackets or gussets 116 extending between, and fixed to, beams 104 and 114. Frame 100 also includes a rear wall 118 that is fixed to beam 102 and 104. Frame 100 also includes a concave and longitudinally extending auger trough 120 that extends between and is coupled to left and right end sheets 122, 124 of the combine head frame.

In use, the combine head frame traverses a field in the direction of arrow A. Thus, the longitudinal axis of auger trough 120 is substantially at right angles to the direction of movement A through a crop field. As indicated previously, crop material is placed into auger trough 120 and moved by flights of an auger (not shown) to move crop material from end plates 122 and 124 towards the center of the combine head frame where they are discharged in the direction of arrow B through central opening 119 in rear wall 118. As herein illustrated, the laterally extending beams for the fore and aft brackets or gussets and end sheets are affixed to one another, some by welding and others by removable fasteners. It should be apparent to those skilled in the art that the components may be assembled as a single structure using any combination of appropriate fastening mechanisms.

The left end and the right end of auger trough 120 have rectangular openings 126, 128, respectively, that extend through the auger trough from the inside to the outside. Openings 126, 128 are disposed in the trough 120, preferably at or adjacent to the lowest point of the curved auger trough 120 when the combine head frame is placed in a crop waste material clean out position. In the clean out position, and in the normal operating position, each plane of openings 126, 128 is disposed generally horizontally. Openings 126, 128 are mirror images of each other disposed in substantially identical positions on opposite sides of the combine head trough and have identical dimensions; the only difference being that they are disposed on opposite ends of the combine head frame.

Figure 4:
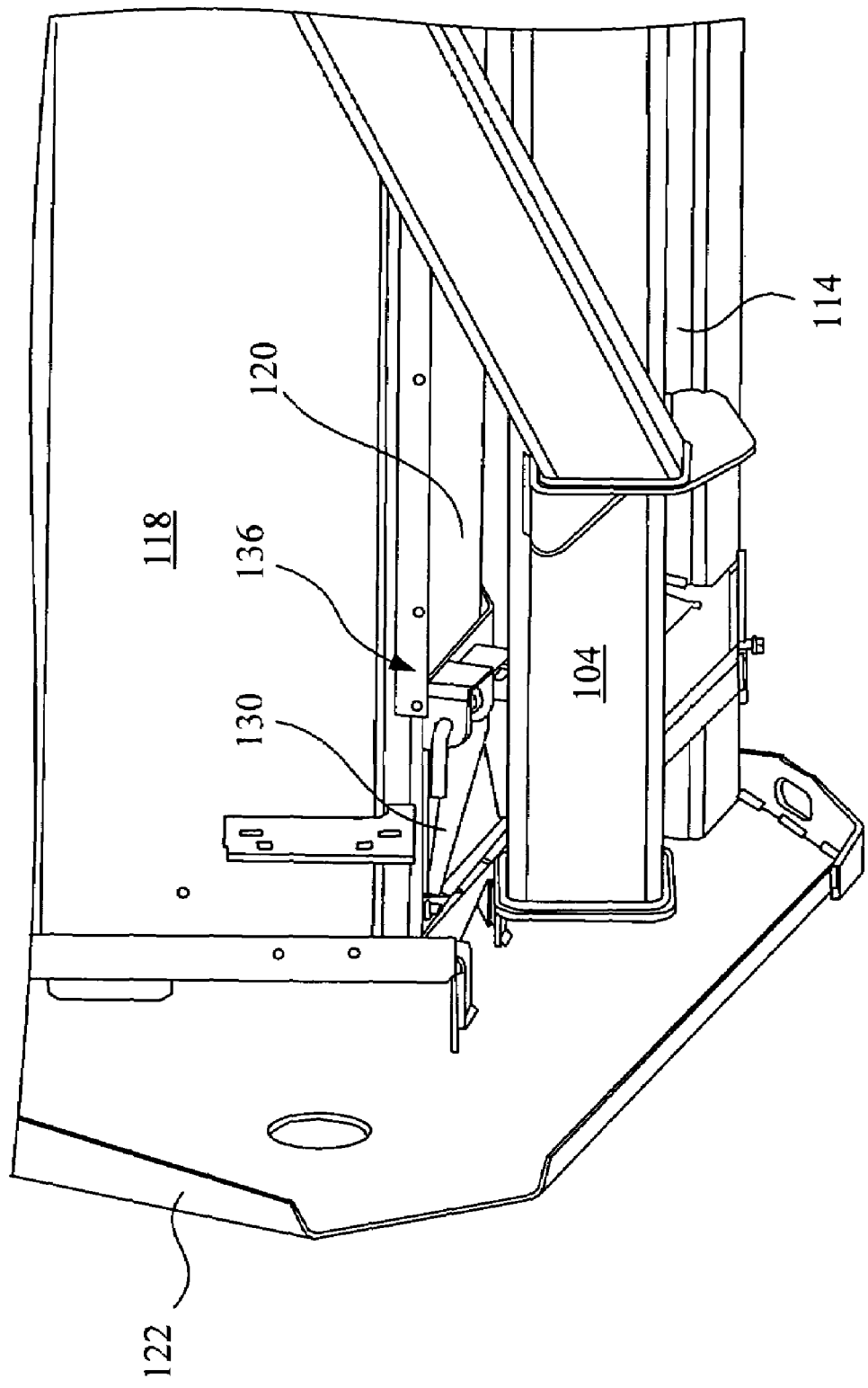
FIG. 4 is an enlarged partial perspective view of the combine head of FIG. 1, taken from the aft side.
Figure 5:
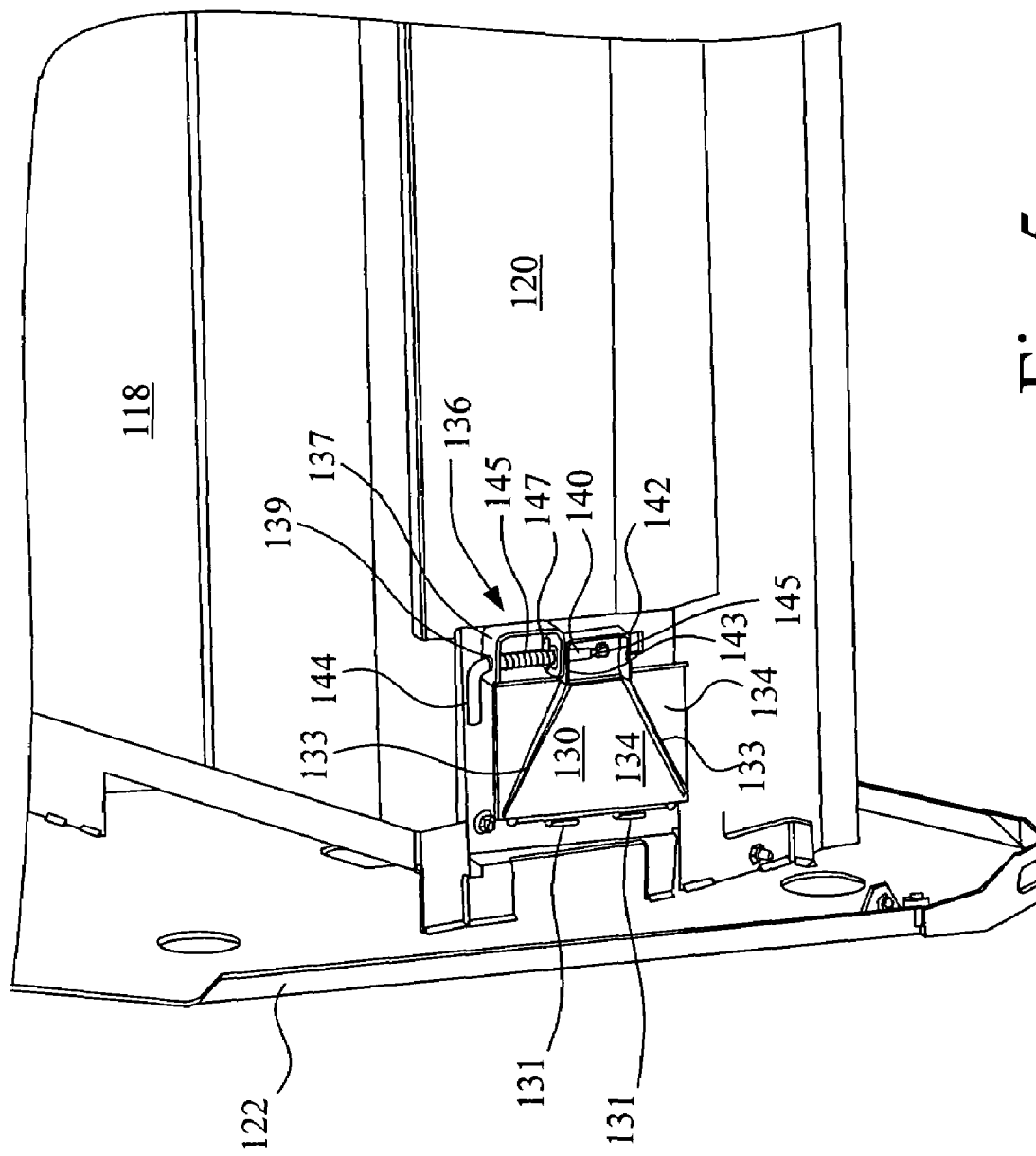
FIG. 5 is an enlarged perspective view taken from the bottom side of FIG. 1 with several of the parts removed to show cleanout doors.
Figure 6:
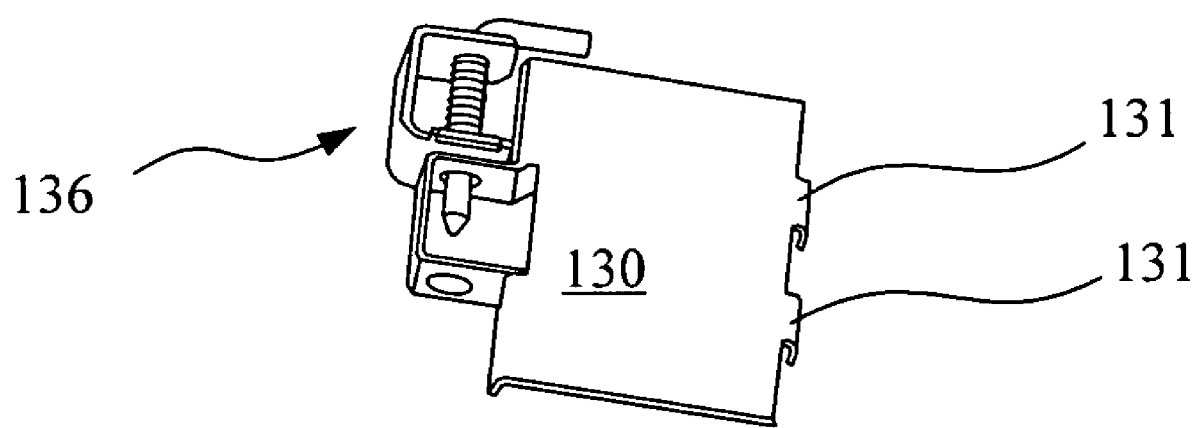
FIG. 6 is an exploded fragmentary view of the doors particularly shown in FIG. 5.

As shown in FIGS. 4-6, each opening 126, 128 is covered by a door and a latch assembly fixed to the underside of the trough. In FIGS. 3-6 herein, only the left door 130 (looking in the direction of arrow A of FIG. 1) and latch 136 are shown. The right door and latch are identically configured and arranged but are mounted on the opposite end of the trough to cover the other opening 128. The right door and latch are mirror images of the illustrated left door 130 and latch 136 as referenced to a line that is perpendicular to, and at the midpoint, of the combine head beams and auger but are disposed over the opening 128 at the other end of the trough 120.

Door 130 is formed from a sheet material and includes an integral hinge 131 in the form of tabs that are wrapped around an appropriate pin or inserted into a slot (not shown) which is affixed to the auger trough 120 at the outer ends thereof so that the door hinges are towards the outside of the unit. As shown particularly in FIG. 5, the door 130 has an eye, or handle 142 on its bottom surface 134. Eye 142 is formed from a strap bent to form the eye 142 and which is integral with a pair of legs 133 extending away from one another to the side of door 130 adjacent hinge elements 131. The legs 133 are appropriately affixed to door 130 to provide a strengthening function. Legs 133 may be welded, riveted, or affixed in any appropriate manner. Eye 142 has a hole 143 that enables the door to be locked in its closed position.

Latch 136 is formed from a U-shaped strap 137, fixed to the bottom surface of the trough 120. It includes a pin 140 leading to a handle 144 integral with pin 140 and bent at 90° to form an L-shape structure. Pin 140 extends through aligned holes 139 in strap 137 so that the handle 144 is on one side of the strap and the pin 140 extends through the hole and beyond the strap 137. Pin 140 has a cone-like end 145 to facilitate entry in hole 143 of eye 142 as described below. Pin 140 has a spring 145 telescoped over it. Spring 145 acts on one wall of strap 137 and on a cross pin 147 fixed to pin 140 of sufficient length to capture one end of spring 145. In the arrangement shown, pin 140 is urged to its position wherein it extends a maximum distance beyond strap 137. Pin 140 engages the hole 143 in eye 142 fixed to the bottom surface 134 of door 130. Pin 140, when engaged with the hole 143 in eye 142, holds the door closed and prevents grain and other crop material from escaping through openings 126, 128 and falling on the ground.

To open the door, the operator goes to the rear of the combine head and grasps handle 144 which is attached to pin 140. The operator then pulls handle 144 backwards, towards the rear of the combine. This pulling compresses coil spring 145 and withdraws the pin 140 from the eye 142. With the pin 140 withdrawn from the eye 142, the door 130 is free to open, pivoting about the hinge 131 under the force of gravity until the door hangs downward leaving opening 126 uncovered. In this position, the operator can take a water hose or power washer and flush all loose material from the upper trough, through the now-uncovered opening 126 and on to the ground. In the absence of a water source the operator can use other means to push the material to and through the doors. The operator can, of course, open the other door in the same manner and flush material out the other opening.

If the combine happens to be on angled ground so that one end of the combine head is at a lower elevation than the other, the water mixed with plant matter will run down to the lowest point in the trough, which is at or adjacent to the opening 126 or 128, depending upon which end of the corn head is lower. The operator can either open both doors, or the operator can open the door that is lowest. Typically, the operator will raise the corn head slightly above the ground to permit the mixed water and plant matter falling through the openings to escape on the ground and not remain in contact with the corn head. Having described the preferred embodiment, it will become apparent that various modifications can be made without departing from the scope of the invention as defined in the accompanying claims.

The invention claimed is:

1. A combine head trough assembly for receiving crop material, said combine head trough assembly comprising:
   a longitudinally-extending trough panel configured to surround at least the lower portion of a cross auger of a combine head, wherein the trough panel defines first and second openings in a lower portion thereof, said first and second openings being disposed adjacent either outer end of the trough panel; and
   a door positioned at the first and second openings and hinged to be displaceable between a closed position and an open position; and
   a latch coupled to each of the first and second doors, and further wherein each latch is configured to hold its associated door closed sufficient to prevent the leakage of crop material through each door's associated opening.

2. A combine head trough assembly as claimed in claim 1, wherein the door, in the closed position, prevents leakage of crop material therethrough and, in the open position, permits the exit of waste crop material.

3. A combine head trough assembly as claimed in claim 1, wherein the plane of the first and second openings is disposed generally horizontally when the combine head trough is in its normal operating position.

4. A combine head trough assembly as claimed in claim 1, wherein the plane of the first and second openings is disposed generally horizontally when the combine head trough is in its normal clean out position.

5. A combine head trough assembly as claimed in claim 1, further comprising end sheets connected at the ends of the trough panel, said end sheets extending generally at right angles to said trough panel.

6. A combine head trough assembly as claimed in claim 5, further comprising cross beams extending between said end sheets to provide structural support therefore.

7. A combine head trough assembly as claimed in claim 6, further comprising a rear panel interconnected with said trough panel and said end sheets said rear panel being generally at right angles to said end sheets.

8. A combine head trough assembly as claimed in claim 6, wherein said rear panel has a central crop material opening for passing crop material from said head trough assembly to a combine.

9. The combine head trough assembly of claim 1, wherein each latch further comprises a spring-loaded pin.

10. The combine head trough assembly of claim 9, wherein each latch further comprises an eye fixed to the bottom of the door and configured to engage the pin to hold its associated door closed.

11. A combine head trough assembly as claimed in claim 1, wherein said doors comprise plates sized to cover said opening in said closed position and said doors have a frame affixed to the side of the doors away from said opening, said frame being bent to form an eye beyond the free end of said plate.

12. A combine head trough assembly as claimed in claim 11, further comprising a latch releasably connected to said eye for maintaining said doors in a closed position and allowing them to pivot to an open position to remove waste crop material.

13. A combine head trough assembly as claimed in claim 12, wherein said latch comprises a pin displaceable in a U-shaped base affixed to said auger trough panel, said pin being displaceable between a position where it maintains said doors in the closed position and another position in which it allows the doors to pivot to an open position.

14. A combine head trough assembly as claimed in claim 13, wherein said eye has an opening in alignment with said pin whereby when said pin is received in said hole it holds the doors in the closed position.

15. A combine head trough assembly as claimed in claim 14, wherein said pin is spring loaded to a position wherein the pin is maintained in the opening in said eyes.

16. A combine head trough assembly for receiving crop material, said combine head trough assembly comprising:

a longitudinally-extending trough panel configured to surround at least the lower portion of a cross auger of a combine head, wherein the trough panel defines first and second openings in a lower portion thereof, said first and second openings being disposed adjacent either outer end of the trough panel;

individual doors positioned at the first and second openings and displaceable between a closed position and an open position; and a latch coupled to each of the doors, each latch being configured to hold its associated door closed to prevent the leakage of crop material through each door's associated opening.

* * * * *